United States Patent Office 3,796,682
Patented Mar. 12, 1974

3,796,682
MOLDING COMPOSITION
Manfred Lottermoser, Wedel, Holst, Gundolf Fuchs, Steinbek Meilsen uber Bucholz, Hans-Albrecht Meyer-Stoll, Rheinkamp, Dietrich Pirck, Reinbek, and Baldur Rauscher, Hamburg, Germany, assignors to Deutsche Texaco Aktiengesellschaft, Hamburg, Germany
No Drawing. Filed Aug. 12, 1971, Ser. No. 171,366
Claims priority, application Germany, Aug. 17, 1970,
P 20 40 711.8
Int. Cl. C08g 51/04
U.S. Cl. 260—42.29          3 Claims

ABSTRACT OF THE DISCLOSURE

A molding composition which may be cured to a polyurethane-bound material prepared by mixing of between about 80 and 98 wt. percent sand, between about 1 and 10 wt. percent of a diisocyanato compound and between about 1 and 10 wt. percent of a polyalkoxylated copolymer material selected from the group consisting of (a) an alkoxylated copolymer of styrene and a half ester of an unsaturated dicarboxylic acid, (b) a mixture of the alkoxylated copolymer of (a) and a phenol-formaldehyde resin, (c) a mixture of the alkoxylated copolymer of (a) and an alkanone-formaldehyde condensation product, and (d) a mixture of the alkoxylated copolymer of (a) and an alkyd resin.

BACKGROUND OF INVENTION

One of the widely employed molding materials for manufacturing polyurethane-bound molds and cores, hereafter called "molded pieces," for use in metal casting are mixtures of sand, aromatic oligoisocyanates, and solutions of particular phenol-formaldehyde resins or polyamide- and oil-modified alkyd resins. The phenol-formaldehyde resins contained in these known molding materials are produced by condensation of phenol and formaldehyde with methylol groups bonded to the phenol rings. The polyamide- and oil-modified alkyd resins contained in the known molding materials are produced by modified esterification of polyvalent alcohols and dibasic carboxylic acids in which the alcoholic hydroxyl group remained unesterified. When the molded pieces manufactured from these molding materials are cured, the isocyanate group reacts with the methylol group and the alcoholic hydroxyl group in a manner to form urethane groups. Therefore, the sand grains in the cured molded pieces are bound by polyurethane. These reactions leading to the formation of urethane groups occur spontaneously. However, they also may be catalytically activated according to known methods using the standard peroxide, metal salt and tertiary amine polymerization catalysts.

The polyurethane-bound molded pieces manufactured from the prior molding materials have a relatively limited thermal shock resistance. This deficiency is particularly noticeable in molded pieces with large surface, thin walled areas, especially where the thin walled portions join the thick walled portions of the molded pieces. An accumulation of such areas susceptible to thermal shock are found in molded pieces for use in casting ribbed cylinders. Ribbed cylinders for air-cooled combustion engines present a very large number of cooling fins which are as high as possible, narrow spaced and have the smoothest possible surface in order to insure the most efficient air cooling. Thus, the molded pieces for casting ribbed cylinders present huge numbers of high, thin-walled "fins," joining thick-walled "body" of the molded piece. The thermal shock following the pouring of metal into the molded piece often causes the fins to crack or to break off from the body of the molded pieces which renders the molded piece completely useless or requires a very costly reprocessing of the molded pieces to remove the cracks in the fins called "burrs," as these increase the flow resistance considerably and thus reduce the efficiency of the air-cooling. This disadvantage of the prior polyurethane-bound molded pieces is a considerable drawback regarding the introduction of such molded pieces into the metal casting sector concerned with the manufacture of ribbed cylinders. In this field prior to the subject invention there was a need for polyurethane-bonded molded pieces manufactured on a large scale of improved thermal shock resistance.

SUMMARY OF INVENTION

We have discovered and this constitutes our invention new polyurethane-bound molding composition based on mixtures of sand, aromatic oligoisocyanates and resins containing aliphatic bonded hydroxyl groups characterized in that the resins containing the aliphatic bonded hydroxyl groups contain, or are, alkoxylated copolymers comprising styrene and half esters of unsaturated dicarboxylic acids. Such alkoxylated copolymers are obtained by copolymerizing styrene and half esters of unsaturated dicarboxylic acids, and reacting the obtained copolymer with alkene oxides which react with the carboxylic groups of the half esters to form hydroxyl ester groups. The preferred polymers are ethoxylated styrene-maleic acid half ester copolymers. Depending on the amount of polar and non-polar groups, the alkoxylated copolymers consisting of styrene and half esters of unsaturated dicarboxylic acids can be utilized to produce additional novel polymers by combining with phenolaldehyde resins, polyester resins and particularly with polyamide- and oil-modified alkyd resins. They may be further combined with condensation products of aliphatic ketones and formaldehyde, being components of molding materials according to German patent application No. P 20 40 437.9. Molding materials according to the present invention may be processed by known methods.

Detailed description of the invention

The molding composition is prepared by mixing at room temperature between about 80 and 98 wt. percent sand, between about 1 and 10 wt. percent of a diisocyanato compound of the formula:

$$OCN-R^1-NCO$$

where $R^1$ is phenylene or hydrocarbyl substituted or unsubstituted diphenylene alkane of from 13 to 30 carbons and between about 1 and 10 wt. percent of a polyalkoxylated material selected from the group consisting of (a) An alkoxylated copolymer of styrene and a half ester of an unsaturated dicarboxylic acid of the formula:

$$R^2OOC-CH=CH-COOH$$

where $R^2$ is alkyl of from 1 to 12 carbons formed by reacting an alkylene oxide of the formula:

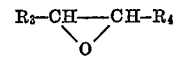

where $R_3$ and $R_4$ are hydrogen or the methyl group with the copolymer of styrene and said half ester until an acid number of less than 5 mg. KOH/g. is obtained, said copolymer produced by reacting styrene and said half ester utilizing a mole ratio of styrene to said half ester of between about 1:1 and 10:1 to form said copolymer of an average molecular weight of between about 600 and 12,000, (b) A mixture of the alkoxylated resin of (a) and a phenol-formaldehyde resin of a phenol to formaldehyde component mole ratio of between about 1:0.5 to 1:0.9 and an average molecular weight of between about 200 and 2,000, said mixture having a weight ratio of said (a) to said phenol-formaldehyde resin of between about 1:0.1 and 1:3, (c) A mixture of the alkoxylated copolymer of (a) and condensation product of formaldehyde and alkanone of the formula:

where $R_5$ and $R_6$ are alkyl of from 1 to 5 carbons, which may be connected to form a 3- to 6-membered ring, said condensation product prepared by condensing said alkanone and formaldehyde utilizing a mole ratio of said alkanone to said formaldehyde of between about 1:1 and 1:4 until said condensation product is formed having an average molecular weight of between about 100 and 2,500, said mixture of a weight ratio of said (a) to said condensation product of between about 1:0.1 and 1:5; and (d) A mixture of the alkoxylated resin of (a) and an alkyd resin prepared by polycondensation of polyhydric aliphatic alcohols of from 2 to 6 carbons with dicarboxylic acids selected from the group consisting of phthalic acid and dicarboxylic aliphatic acids of the formula:

where $n$ is an integer of from 0 to 5, in the presence of saturated or unsaturated fatty acids of from 12 to 24 carbons or drying or non-drying oils, the alkyd resin having an average molecular weight of between 500 and 8,000, a fatty acid or oil content of from 0 to 70, a dicarboxylic acid content of from 15 to 60, and an acid number of maximally 50 mg. KOH/g.

The so mixed molding composition can be shaped by shooting into core boxes. The shaped cores are cured to polyurethane-bound cores by treating with tertiary amines.

Examples of the half esters of the unsaturated dicarboxylic acids, being components of the alkoxylated copolymers, contemplated herein are n-butyl maleic acid half ester, n-dodecyl maleic acid half ester, isopropyl fumaric acid, 2-butoxyethyl maleic half esters, and mixed half esters of said alcohols.

Examples of the alkylene oxides contemplated herein are ethylene oxide, propylene oxide, and butylene oxide.

Examples of the alkanones contemplated herein are butanone, acetone, methylethyl ketone, cyclohexanone.

Examples of aliphatic dicarboxylic acids, being components of the alkyd resins, contemplated herein are azelaic-, adipic-, maleic-, sebacic, and succinic acid, and anhydrides thereof.

Examples of polyhydrid alcohols contemplated herein are glycol, glycerin, erythritol, and pentaerythritol.

Examples of drying and non-drying oils contemplated herein are linseed oil, fish oil, soy bean oil, and castor oil.

Examples of the saturated or unsaturated fatty acids contemplated herein are palmitic acid, linoleic acid, linolenic acid, stearic acid, oleic acid, and ricinenic acid.

Under advantageous conditions in the formation of the polyurethane-bound molding composition, the alkoxylated copolymer is introduced therein in an inert solvent solution the solvent content normally ranging between about 30 and 70 wt. percent. Examples of the inert solvents contemplated herein are mixtures of $C_7$ to $C_{10}$ aromatics (e.g., toluene, xylene, isopropylbenzene) and cyclohexanone, mixtures of $C_7$ to $C_{10}$ aromatics and methisobutyl ketone, and cyclohexanone.

The following examples demonstrate the novel molding compositions of the invention and their superior thermal shock resistance. The thermal shock resistance is measured in the following examples by forming molded samples from the molding materials being tested in test discs with parallel faces of 1 cm. thickness and 10 cm. diameter, cured and placed on a quartz plate covering the opening of an electric irradiation burner maintained at 1200° C. The time running from the placing of the test disc on the quartz plate over the burner to the moment the disc cracks, offers a relative measure for its thermal shock resistance. Long times mean good, and short times poor resistance to thermal shock.

The following examples illustrate the invention without limiting the scope thereof.

EXAMPLE 1

A copolymer made from styrene and n-butyl maleic acid half ester in a styrene to half ester molar ratio of 2.5:1 of an average molecular weight of 2,400 was subjected to ethoxylation by reacting it with ethylene oxide to achieve an acid number of less than 1 mg. KOH/g. of alkoxylated copolymer. The ethoxylate in an amount of 40 grams was dissolved in 40 grams of a mixture of $C_7$ to $C_{10}$ aromatics and cyclohexanone (60% aromatics and 40% cyclohexanone) to form a 50 wt. percent solution. Eighty grams of this solution, 40 grams of 4,4'-diisocyanato-diphenylmethane and 4 kilograms of quartz sand were mixed to form the molding material. Of this molding material 8 test discs for thermal shock were molded, cured by application of pressurized gasiform triethylamine containing air, left to stand for one hour, and, then, their thermal shock resistance was checked at 1200° C. All of the 8 test discs remained on the quartz plate for 200 seconds each, without cracking. After this period of time, the centers of the test discs started to carbonize, and thereby any tensions that might have caused cracking were completely eliminated.

EXAMPLE 2

A copolymer made from styrene and n-dodecyl maleic acid ester in a styrene to half ester molar ratio of 2.5:1 having an average molecular weight of 4,100 was ethoxylated until an acid number less than 1 mg. KOH/g. substance was achieved. The ethoxylate in an amount of 20 grams was dissolved in 20 grams of a mixture of $C_7$ to $C_{10}$ aromatics and methylisobutyl ketone to form a 50 wt. percent solution. Furthermore, 20 grams of a resin having an average molecular weight of 1,700 obtained by condensing 10 moles of butanone with 24 moles of formaldehyde was dissolved in 20 grams of a mixture of xylenes and cyclohexanone to form at 50 wt. percent solution. Forty grams of each solution, 40 grams of 4,4'-diisocyanatodiphenylmethane, and 4 kilograms of quartz sand were mixed to prepare a molding material, which was treated and tested as in Example 1. Here too, the test discs started to carbonize after the 200 seconds exposure to the burner and no cracking occurred.

EXAMPLE 3

Forty grams of the ethoxylate solution of Example 1, 40 grams of the phenolic resin solution of Example 6, and 40 grams of 4,4'-diisocyanato-diphenylmethane, and 4 kilograms of quartz sand were mixed to prepare a molding material. The molding material was treated and tested as in Example 1. The 8 test discs broke after an average exposure time of 170 seconds, just when carbonization and the related relaxation started.

EXAMPLE 4

A copolymer of styrene (104 g.) and maleic anhydride (98 g.) was prepared in solution at 150° C. with benzoylperoxide as initiator. The solvent was a mixture of $C_7$-$C_{10}$ aromatics and cyclohexanone in a weight ratio of 1:1, and the anhydride polymer was subsequently esterified at 160–170° C. with 106 g. of 2-butoxyethanol for two hours and, then, 40 g. of n-butanol were added and the reaction mixture was heated for another hour at 160° C. Then the solution was propoxylated, after addition of a mixture of 6 g. of dimethylformamide and 6 grams of $H_2O$, at 100°

C. for 6 hours. The acid number was 0.85 mg. KOH/g., based on the hydroxyl resin. Eighty grams of this solution were combined with 40 grams of 4,4'-diisocyanato-diphenylmethane and 6 kilograms of quartz sand and test discs were prepared and tested as described in Example 1. After an exposure for 200 seconds to the burner none of the discs had cracked.

EXAMPLE 5

Forty grams of the ethoxylated solution of Example 1, 40 grams of the alkyd resin solution- the alkyd resin was a commercial oil modified phthalic acid glycerol alkyd resin with a castor oil content of about 40 wt. percent, an acid number of 20 mg. KOH/g., a phthalic acid content of about 48 wt. percent, and an average molecular weight of 2,500, prepared as a 50% solution with the same solvent as for the ethoxylated solution- and 40 grams of 4,4'-diisocyanato-diphenylmethane, and 4 kilograms of quartz sand were mixed to prepare molding material. The molding material was treated and tested as in Example 1. The 8 test discs broke after an average exposure time of 190 seconds due to carbonization but not due to thermal stresses.

EXAMPLE 6

This example discloses the thermal shock inferiority of a known resin-sand composition.

Eighty grams of a 50 wt. percent solution of a commercial phenol-formaldehyde resin having an average molecular weight of about 500, 40 grams of 4,4'-diisocyanato-diphenylmethane, and 4 kilograms of quartz sand were mixed to form a molding material which was treated and tested as in Example 1. All eight of the test discs broke with an audible crack after an average exposure time of 53 seconds.

What is claimed is:

1. A molding composition which may be cured by treating it with tertiary amines prepared by mixing at room temperature of between about 80 and 98 wt. percent sand, between about 1 and 10 wt. percent of a diisocyanato compound of the formula:

$$OCN-R^1-NCO$$

where $R^1$ is phenylene or hydrocarbyl substituted and unsubstituted diphenylene alkane of 13 to 30 carbons and between about 1 and 10 wt. percent of an alkoxylated polymer of styrene and a half ester of an unsaturated dicarboxylic acid of the formula:

$$R^2OOC-CH=CH-COOH$$

where $R^2$ is alkyl of from 1 to 12 carbons, said alkoxylated copolymer formed by reacting an alkylene oxide of the formula:

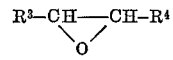

where $R^3$ and $R^4$ are hydrogen or methyl with a copolymer of styrene and said half ester until an acid number less than 5 mg. KOH/g. is obtained, said copolymer of styrene and said half ester formed by reacting styrene and said half ester in a mole ratio of styrene to said half ester of between about 1:1 and 10:1 until said copolymer is formed having an average molecular weight of between about 600 and 12,000.

2. A molding composition in accordance with claim 1 wherein said alkylene oxide is ethylene oxide, said half ester is n-butyl maleic acid half ester, and said diisocyanato compound is 4,4'-diisocyanato-diphenylmethane.

3. A molding composition in accordance with claim 1 wherein said half ester is 2-butoxyethyl maleic half ester, said alkylene oxide is propylene oxide, and said diisocyanate compound is 4,4'-diisocyanato-diphenylmethane.

References Cited

UNITED STATES PATENTS

| | | | |
|---|---|---|---|
| 3,330,890 | 7/1967 | Holt et al. | 260—41 A |
| 3,629,357 | 12/1971 | Sekmakas | 260—77.5 CR |
| 3,655,618 | 4/1972 | Weil | 260—77.5 AT |
| 3,270,088 | 8/1966 | Hicks | 260—78.5 HC X |
| 3,385,345 | 5/1968 | Miraldi | 164—43 |
| 3,403,721 | 10/1968 | Robins et al. | 164—43 |
| 3,428,110 | 2/1969 | Walker et al. | 164—43 |

LEWIS T. JACOBS, Primary Examiner

U.S. Cl. X.R.

260—37 N, Dig. 40, 998.18